(12) United States Patent
Matsunaga

(10) Patent No.: US 9,067,571 B2
(45) Date of Patent: Jun. 30, 2015

(54) TRAVEL CONTROL DEVICE

(75) Inventor: Masaki Matsunaga, Oi-machi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 239 days.

(21) Appl. No.: 13/500,427

(22) PCT Filed: Dec. 18, 2009

(86) PCT No.: PCT/JP2009/071150
§ 371 (c)(1),
(2), (4) Date: Apr. 5, 2012

(87) PCT Pub. No.: WO2011/074115
PCT Pub. Date: Jun. 23, 2011

(65) Prior Publication Data
US 2012/0203440 A1 Aug. 9, 2012

(51) Int. Cl.
| | | |
|---|---|---|
| *G06F 7/00* | (2006.01) | |
| *B60T 7/12* | (2006.01) | |
| *B60T 7/18* | (2006.01) | |
| *B60T 7/22* | (2006.01) | |
| *B60T 8/1755* | (2006.01) | |
| *B60W 10/06* | (2006.01) | |

(Continued)

(52) U.S. Cl.
CPC ... *B60T 7/12* (2013.01); *B60T 7/18* (2013.01); *B60T 7/22* (2013.01); *B60T 8/1755* (2013.01); *B60W 10/06* (2013.01); *B60W 10/184* (2013.01); *B60W 30/18009* (2013.01); *B60W 30/18145* (2013.01); *F02D 29/02* (2013.01); *B60W 2550/143* (2013.01); *B60W 2550/146* (2013.01); *B60W 2720/103* (2013.01)

(58) Field of Classification Search
CPC ............ B60K 31/047; B60K 31/0008; B60W 2720/106; B60W 30/16; B60W 10/06
USPC .......................................................... 701/93
See application file for complete search history.

(56) References Cited

U.S. PATENT DOCUMENTS

| 5,913,910 A | 6/1999 | Ochi et al. | |
|---|---|---|---|
| 6,351,698 B1 * | 2/2002 | Kubota et al. ................... | 701/51 |

(Continued)

FOREIGN PATENT DOCUMENTS

| JP | 9-132060 | 5/1997 |
|---|---|---|
| JP | 2006-123586 | 5/2006 |

(Continued)

OTHER PUBLICATIONS

International Search Report in International Application No. PCT/JP2009/071150; Mailing Date: Feb. 9, 2010.

(Continued)

*Primary Examiner* — Ian Jen
(74) *Attorney, Agent, or Firm* — Finnegan, Henderson, Farabow, Garrett & Dunner, LLP

(57) ABSTRACT

Disclosed is a travel control device which controls the travel of a vehicle. The travel control device includes an acquisition unit which acquires a stability speed limit pattern indicating an upper speed limit, within which the vehicle is travelable without departing from a scheduled travel road, and a travel control adjustment unit which adjusts travel control using a target speed pattern indicating a target speed on the basis of the stability speed limit pattern and an actual speed. Therefore, it is possible to satisfy driving conditions desired by a user while ensuring travel stability.

5 Claims, 12 Drawing Sheets

(51) Int. Cl.
  *B60W 10/184* (2012.01)
  *B60W 30/18* (2012.01)
  *F02D 29/02* (2006.01)

(56) References Cited

U.S. PATENT DOCUMENTS

| | | | |
|---|---|---|---|
| 7,216,023 B2* | 5/2007 | Akita | 701/41 |
| 8,116,972 B2* | 2/2012 | Klampfl et al. | 701/123 |
| 2001/0003436 A1* | 6/2001 | Yoshikawa | 340/439 |
| 2002/0188399 A1* | 12/2002 | Odagawa et al. | 701/202 |
| 2002/0195184 A1* | 12/2002 | Armellin et al. | 152/458 |
| 2006/0030987 A1* | 2/2006 | Akita | 701/41 |
| 2007/0010941 A1* | 1/2007 | Marsh | 701/209 |
| 2008/0059036 A1* | 3/2008 | Imai et al. | 701/93 |
| 2010/0042282 A1 | 2/2010 | Taguchi et al. | |
| 2010/0063725 A1* | 3/2010 | Miura et al. | 701/207 |
| 2010/0145576 A1* | 6/2010 | Doi | 701/41 |
| 2012/0025993 A1* | 2/2012 | Akiyama | 340/576 |
| 2012/0072109 A1* | 3/2012 | Waite et al. | 701/431 |

FOREIGN PATENT DOCUMENTS

| | | |
|---|---|---|
| JP | 2007-187090 | 7/2007 |
| JP | 2007-326548 | 12/2007 |
| JP | 2008-74232 | 4/2008 |
| JP | 2008-129804 | 6/2008 |
| JP | 2008-195226 | 8/2008 |

OTHER PUBLICATIONS

Translation of the International Preliminary Report on Patentability for PCT/JP2009/071150 dated Aug. 9, 2012.

* cited by examiner

TRAVEL CONTROL DEVICE

CROSS-REFERENCE TO RELATED APPLICATIONS

This application is a national phase application of International Application No. PCT/JP2009/071150, filed Dec. 18, 2009, the contents of which are incorporated herein by reference.

TECHNICAL FIELD

The present invention relates to a travel control device.

BACKGROUND ART

In the related art, as a device which controls the travel of a vehicle, a device is known which generates a travel control plan and performs cooperation control to change an input of a driver on the basis of the generated travel control plan (for example, see Patent Literature 1). The device described in Patent Literature 1 sets a target speed, at which the vehicle can stably pass, on the basis of road circumstances, such as road curvature, road surface friction, and gradient of the road. The device automatically adjusts speed or acceleration such that the vehicle speed becomes a set target speed.

CITATION LIST

Patent Literature

[Patent Literature 1] Japanese Unexamined Patent Application Publication No. 2007-326548

SUMMARY OF INVENTION

Technical Problem

However, since the travel control device of the related art simply controls the travel such that the vehicle speed becomes the target speed at which the vehicle can stably pass, it is difficult to satisfy driving conditions (for example, mileage, trip time, drivability, and the like) desired by the driver while ensuring travel stability. For example, the vehicle may arrive at a destination late because stability is emphasized.

Accordingly, the invention has been finalized in order to solve the above-described technical problem, and an object of the invention is to provide a travel control device capable of satisfying driving conditions desired by a user while ensuring travel stability.

Solution to Problem

That is, an aspect of the invention provides a travel control device which controls the travel of a vehicle. The travel control device includes an acquisition unit which acquires a stability speed limit pattern indicating an upper speed limit, within which the vehicle is travelable without departing from a scheduled travel road, and a travel control adjustment unit which adjusts travel control using a target speed pattern indicating a target speed on the basis of the stability speed limit pattern and an actual speed.

In the travel control device according to the aspect of the invention, the acquisition unit acquires the stability speed limit pattern indicating the upper speed limit within which the vehicle is travelable without departing from the scheduled travel road, and the travel control adjustment unit adjusts travel control using the upper speed limit on the basis of the stability speed limit pattern and the actual speed. For this reason, for example, when travel control is performed such that the actual speed becomes the target speed derived from the target speed pattern satisfying the desire of the driver, it is possible to adjust travel control while evaluating travel stability on the basis of the stability speed limit pattern and the actual speed. Therefore, it becomes possible to satisfy the driving conditions desired by the user while ensuring travel stability.

The stability speed limit pattern may be generated on the basis of a plurality of road curvatures of the scheduled travel road, and the target speed pattern may be generated using the stability speed limit pattern and an ideal speed pattern satisfying the driving conditions desired by the driver.

The travel control adjustment unit may change the degree of intervention of travel control between when the difference between the actual speed and the upper speed limit derived from the stability speed limit pattern is equal to or greater than a predetermined value and when the difference is smaller than the predetermined value.

With this configuration, for example, it is possible to change the degree of intervention of travel control in accordance with whether or not the acceleration request of the driver is within the speed range satisfying travel stability. For this reason, it becomes possible to reduce a sense of discomfort imposed on the driver due to intervention control on the device side within the speed range satisfying stability.

The travel control adjustment unit may continuously change the degree of intervention of travel control in accordance with the difference between the actual speed and the upper speed limit derived from the stability speed limit pattern. With this configuration, it is possible to gradually increase or gradually decrease the degree of intervention of travel control in accordance with the difference between the upper speed limit and the actual speed. Therefore, it becomes possible to further reduce a sense of discomfort imposed on a driver due to intervention control on the device side within the speed range satisfying the stability.

The travel control device according to the aspect of the invention may further include a speed difference prediction unit which predicts the difference between a future speed when passing through a future arrival point in a scheduled travel locus of the scheduled travel road and a future upper speed limit derived from the stability speed limit pattern on the basis of the actual speed. The travel control adjustment unit may change the degree of intervention of travel control between when the difference between the future speed and the future upper speed limit derived from the stability speed limit pattern is equal to or greater than a predetermined value and when the difference is smaller than the predetermined value.

With this configuration, it is possible to determine whether or not it is within the speed range satisfying travel stability in the future using the difference between the future speed and the future upper speed limit derived from the stability speed limit pattern. For this reason, it becomes possible to satisfy the driving conditions desired by the user while predicting and verifying travel stability.

Advantageous Effects of Invention

With the travel control device according to the aspect of the invention, it is possible to satisfy driving conditions desired by a user while ensuring travel stability.

DESCRIPTION OF EMBODIMENTS

Figure 1:
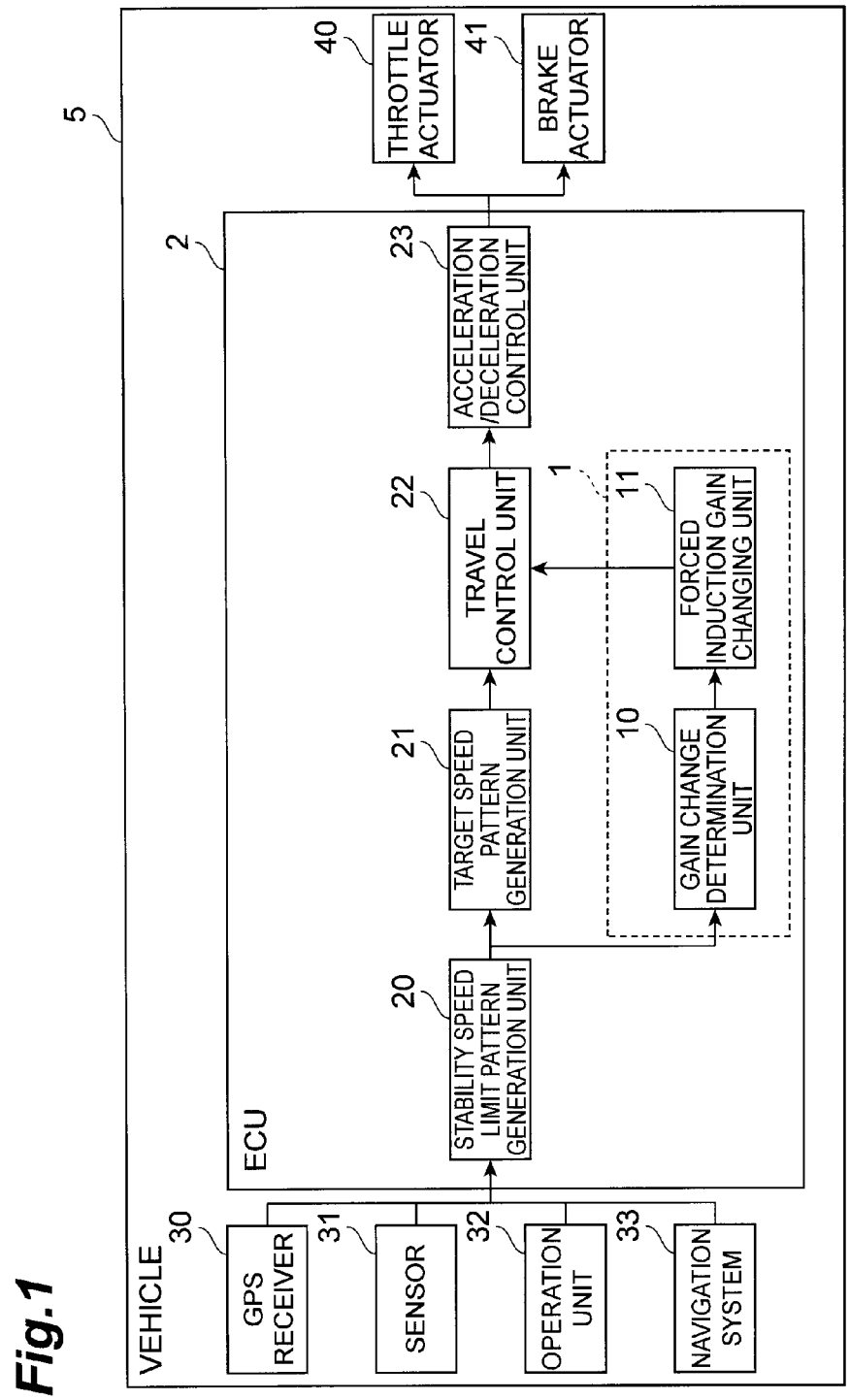
FIG. 1 is a schematic configuration diagram of a vehicle in which a travel control device according to an aspect of the invention is mounted.

Hereinafter, embodiments of the invention will be described with reference to the accompanying drawings. In the drawings, the same or equivalent parts are represented by the same reference numerals, and overlapping description will not be repeated.

(First Embodiment)

A travel control device of this embodiment is a device which controls the travel of a vehicle, and is appropriately used in, for example, a vehicle which has an automatic driving function, such as follow-up driving or lane-keeping driving, or a vehicle in which a driver support system for improving travel stability is mounted.

First, the configuration of the travel control device of this embodiment will be described. FIG. 1 is a block diagram showing the configuration of a vehicle 5 which has a travel control device 1 of the embodiment. The vehicle shown in FIG. 1 is a vehicle 5 which has an automatic driving function, and includes a GPS receiver 30, a sensor 31, an operation unit 32, a navigation system 33, an ECU 2, a throttle actuator 40, and a brake actuator 41. The ECU (Electronic Control Unit) is a computer of an electronically controlled automobile device, and includes a CPU (Central Processing Unit), a ROM (Read Only Memory), a RAM (Random Access Memory), an input/output interface, and the like.

The GPS receiver 30 has a function of receiving, for example, position information of the driver. The GPS (Global Positioning System) is a measurement system using satellites and is appropriately used for recognizing the current position of the host vehicle. The GPS receiver 30 also has a function of outputting the position information to the ECU 2.

The sensor 31 has a function of acquiring the travel environment around the vehicle 5 or the travel state of the host vehicle. As the sensor 31, for example, a speed sensor, an acceleration sensor, a yaw rate sensor, a steering angle sensor, a white line detection sensor, an image camera for monitoring the surroundings of the vehicle 5, an electromagnetic-wave sensor or a millimeter-wave sensor for detecting an obstacle around the vehicle 5 or a succeeding vehicle, and the like are used. The sensor 31 also has a function of outputting the acquired information to the ECU 2.

The operation unit 32 has a function of inputting the conditions requested by the driver. As the operation unit 32, for example, an operation panel for inputting a target trip time, a target mileage, driving conditions (mileage preference travel, trip time preference travel, drivability preference travel, environmentally regulated gas reduction travel) desired by the driver, and the like, a steering wheel for inputting a steering request, a brake pedal for inputting a deceleration request, an accelerator pedal for inputting an acceleration request, and the like are used. The operation unit 32 also has a function of outputting input information to the ECU 2.

The navigation system 33 has a function of calculating a scheduled travel route to a predetermined point (for example, a destination). For example, the navigation system 33 acquires a point of departure and a destination designated by an operation of the driver or the like, and calculates a travel route from the point of departure to the destination using a map database. For example, the navigation system 33 may acquire the current position of the host vehicle from the GPS, and may calculate a scheduled travel route between the current position and the destination. The navigation system 33 also has a function of reading road information of the scheduled travel route from the map database and outputting the road information to the ECU 2. With regard to the map database, the map database which is provided in the navigation system 33 may be used, or a map database which is acquired from an external recording medium or by communication may be used. The road information is information relating to the road, and includes, for example, the shape, gradient, width, road surface frictional coefficient, and the like of the road.

The ECU 2 is connected to the GPS receiver 30, the sensor 31, the operation unit 32, and the navigation system 33, and includes a stability speed limit pattern generation unit 20, a target speed pattern generation unit 21, a travel control unit 22, an acceleration/deceleration control unit 23, a gain change determination unit (acquisition unit, travel control adjustment unit) 10, and a forced induction gain changing unit (travel control adjustment unit) 11.

The stability speed limit pattern generation unit 20 has a function of generating a stability speed limit pattern. The stability speed limit pattern is an upper speed limit within which the vehicle can pass without departing from the scheduled travel road (a stability speed limit which is a maximum speed within which the vehicle is stably travelable along a scheduled travel locus), and depends on, for example, position (distance) or time. The stability speed limit pattern generation unit 20 generates the stability speed limit pattern on the basis of the road information of the scheduled travel road. For example, the stability speed limit pattern generation unit 20 generates the stability speed limit pattern on the basis of a plurality of road curvatures of the scheduled travel road. Specifically, the stability speed limit pattern generation unit 20 calculates the upper speed limit, within which the vehicle can stably pass without departing from the scheduled travel road, within the range satisfying a road environmental request, such as road curvature and road surface frictional coefficient, a traffic request that the vehicle has to travel on the road at equal to or lower than a predetermined speed, and a request for vehicle performance, such as a friction circle limit, an acceleration/deceleration limit, or a steering limit. The stability speed limit pattern generation unit 20 uses a known method, such as an optimization method, to generate the stability speed limit pattern. The stability speed limit pattern generation unit 20 outputs the calculated stability speed limit pattern to the target speed pattern generation unit 21 and the gain change determination unit 10.

The target speed pattern generation unit 21 has a function of generating a target speed pattern. The target speed pattern is the target speed of the vehicle, for example, a speed depending on a position (distance) or time. The target speed pattern generation unit 21 includes a logic which derives a target speed pattern evaluated as an optimum when driving conditions desired by the driver are provided. Specifically, when the driver sets such that a predetermined desired arrival point, a desired arrival time, and mileage are given preference, the target speed pattern generation unit 21 derives a speed pattern evaluated to have good mileage within a range, in which the vehicle can arrive at the desired arrival point at the desired arrival time and can stably travel, as the target speed pattern. For example, when the driver sets such that a desired arrival point, a desired arrival time, and riding quality are given preference, the target speed pattern generation unit 21 derives a speed pattern evaluated to have the smallest amount of change in horizontal G or jerk within a range, in which the vehicle can arrive at the desired arrival point at the desired arrival time and can stably travel, as the target speed pattern. The target speed pattern generation unit 21 uses the method of the related art, such as an optimization method, as the above-described logic. For example, the target speed pattern generation unit 21 generates the target speed pattern using the stability speed limit pattern and an ideal speed pattern satisfying the driving conditions desired by the driver. The ideal speed pattern is a speed which can most satisfy the driving conditions desired by the driver, and exists for each driving condition. The ideal speed pattern is, for example, a speed within a range satisfying a request resulting from vehicle performance, such as a friction circle limit, an acceleration limit, or a steering limit derived on the basis of vehicle specification information. As the ideal speed pattern, for example, there are an ideal speed pattern of mileage preference travel, an ideal speed pattern of trip time preference travel, drivability preference travel, and the like. For example, the target speed pattern generation unit 21 changes the ideal speed pattern satisfying the desired driving conditions of the driver to generate the target speed pattern such that the target speed is lower than a stability speed limit obtained from the stability speed limit pattern. The target speed pattern generation unit 21 outputs the calculated target speed pattern to the travel control unit 22.

The travel control unit 22 has a function of controlling the travel of the vehicle. The travel control unit 22 has a function of generating a control value for controlling each actuator on the basis of the scheduled travel route and the target speed pattern output from the target travel control pattern generation unit 14 taking into consideration the behavior of the vehicle 5 such that the position and speed at each time can be fully reproduced. The travel control unit 22 has a function of adjusting both a driver's request input by the operation unit 32 and a control-side request set as the target speed pattern. For example, the travel control unit 22 compares a target speed derived using the target speed pattern and the current position (or current time) with a requested speed (or requested acceleration) of the driver, and performs intervention control such that the difference between the target speed and the actual speed decreases. The requested speed or requested acceleration of the driver is a physical amount which is estimated from the current input amount of the accelerator pedal, the input amount of the brake pedal, and the vehicle speed, and indicates the speed or acceleration which is currently requested by the driver. The travel control unit 22 intervenes such that, for example, as the requested speed becomes higher than the target speed, the output amount with respect to the amount of depression decreases. To the contrary, the travel control unit 22 intervenes such that, for example, as the requested speed becomes lower than the target speed, the output amount with respect to the amount of depression increases. Although the intervention control using the speed has been described, intervention control using the acceleration may be performed. The travel control unit 22 performs intervention control using, for example, a discrimination threshold value and a time-series discrimination threshold value taking into consideration a sense of discomfort imposed on the driver due to intervention control. The discrimination threshold value is a minimum value such that stimulation can be identified. The time-series discrimination threshold value is a minimum value such that a change in stimulation can be identified. The travel control unit 22 performs control such that the vehicle speed becomes as close to the target speed as possible within a range such that a variation in the speed, acceleration or the like due to intervention control does not exceed the discrimination threshold value and a differential amount of the speed, acceleration or the like due to intervention control does not exceed the time-series discrimination threshold value. That is, the travel control unit 22 performs intervention control with the discrimination threshold value and the time-series discrimination threshold value as an intervention gain. The travel control unit 22 outputs acceleration/deceleration control information set using the discrimination threshold value and the time-series discrimination threshold value to the acceleration/deceleration control unit 23.

The acceleration/deceleration control unit 23 has a function of generating signals for controlling the throttle actuator 40 and the brake actuator 41 on the basis of the acceleration/deceleration control information input from the travel control unit 22, and outputting the generated control signals to the throttle actuator 40 and the brake actuator 41. The throttle actuator 40 is a mechanical constituent element which controls the travel of the vehicle, and is, for example, an electronic throttle or the like. The brake actuator 41 is, for example, a valve or the like which adjusts the brake hydraulic pressure of each wheel in the case of a hydraulic brake. The throttle actuator 40 and the brake actuator 41 function as a by-wire actuator.

The gain change determination unit 10 has a function of determining whether or not to change an intervention gain which is used by the travel control unit 22. The gain change determination unit 10 compares a stability speed limit derived using the stability speed limit pattern output from the stability speed limit pattern generation unit 20 and the current position (or current time) with the actual speed output from the sensor 31 to determine whether or not to change the intervention gain. The gain change determination unit 10 outputs the determination result to the forced induction gain changing unit 11.

The forced induction gain changing unit 11 has a function of changing the intervention gain on the basis of the determination result of the gain change determination unit 10. The forced induction gain changing unit 11 changes a forced induction gain to change the intervention gain, that is, the discrimination threshold value and the time-series discrimination threshold value. If the forced induction gain is $G_K$, and a reference discrimination threshold value is $B_{standard}$, the discrimination threshold value B can be expressed by Expression 1.

$$B = B_{standard} \cdot G_K \qquad (1)$$

If a reference time-series discrimination threshold value is $Bt_{standard}$, the time-series discrimination threshold value Bt can be expressed by Expression 2.

$$Bt = Bt_{standard} \cdot G_K \qquad (2)$$

With regard to the reference discrimination threshold value $B_{standard}$ and the reference time-series discrimination threshold value $Bt_{standard}$, a predetermined value defined in advance by an experiment or the like is used. As shown in Expressions 1 and 2, since the larger the forced induction gain, the larger the intervention gain, it can be understood that the degree of intervention control so as to follow the target speed is strengthened. The forced induction gain changing unit 11 changes the forced induction gain $G_K$ to change the intervention gain.

The vehicle travel control device 1 includes the gain change determination unit 10 and the forced induction gain changing unit 11 described above.

Figure 2:
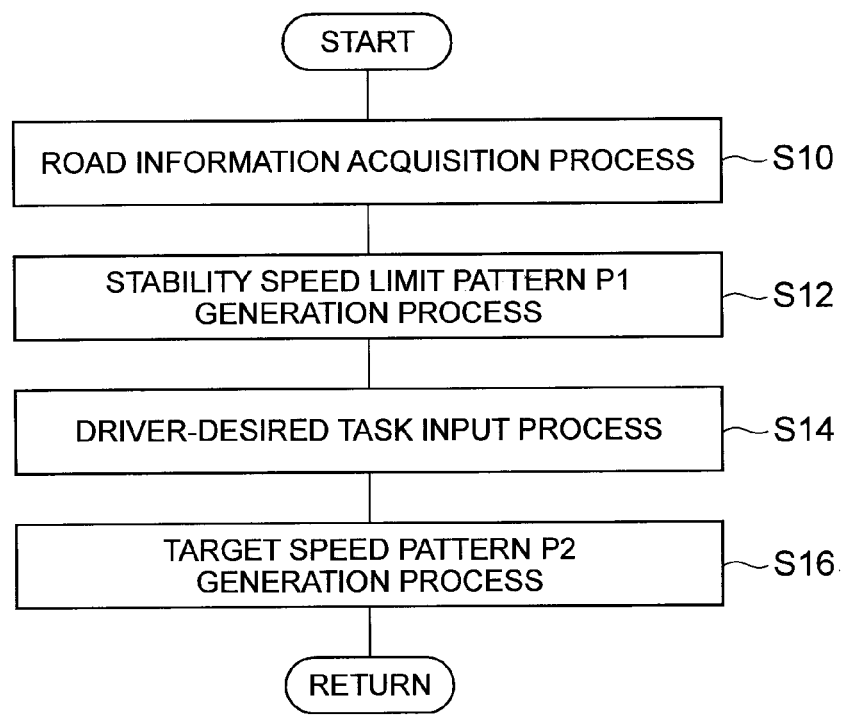
FIG. 2 is a flowchart showing an operation to generate a stability speed limit pattern and a target speed pattern.

Next, travel control of the vehicle 5 in which the above-described travel control device 1 is mounted will be described. First, an operation to generate a stability speed limit pattern and a target speed pattern input from the travel control device 1 will be described. FIG. 2 is a flowchart showing an operation to a stability speed limit pattern and a target speed pattern of the vehicle 5 including the travel control device 1 of this embodiment. A control process shown in FIG. 2 is repeatedly performed at a predetermined interval, for example, after ignition is on or a travel control start button in the vehicle 5 is on.

As shown in FIG. 2, the ECU 2 starts from a road information acquisition process (S10). In the process of S10, the stability speed limit pattern generation unit 20 acquires road information of a scheduled travel road from the navigation system 33 or the sensor 31. If the process of S10 ends, a stability speed limit pattern generation process is performed (S12).

Figure 3:
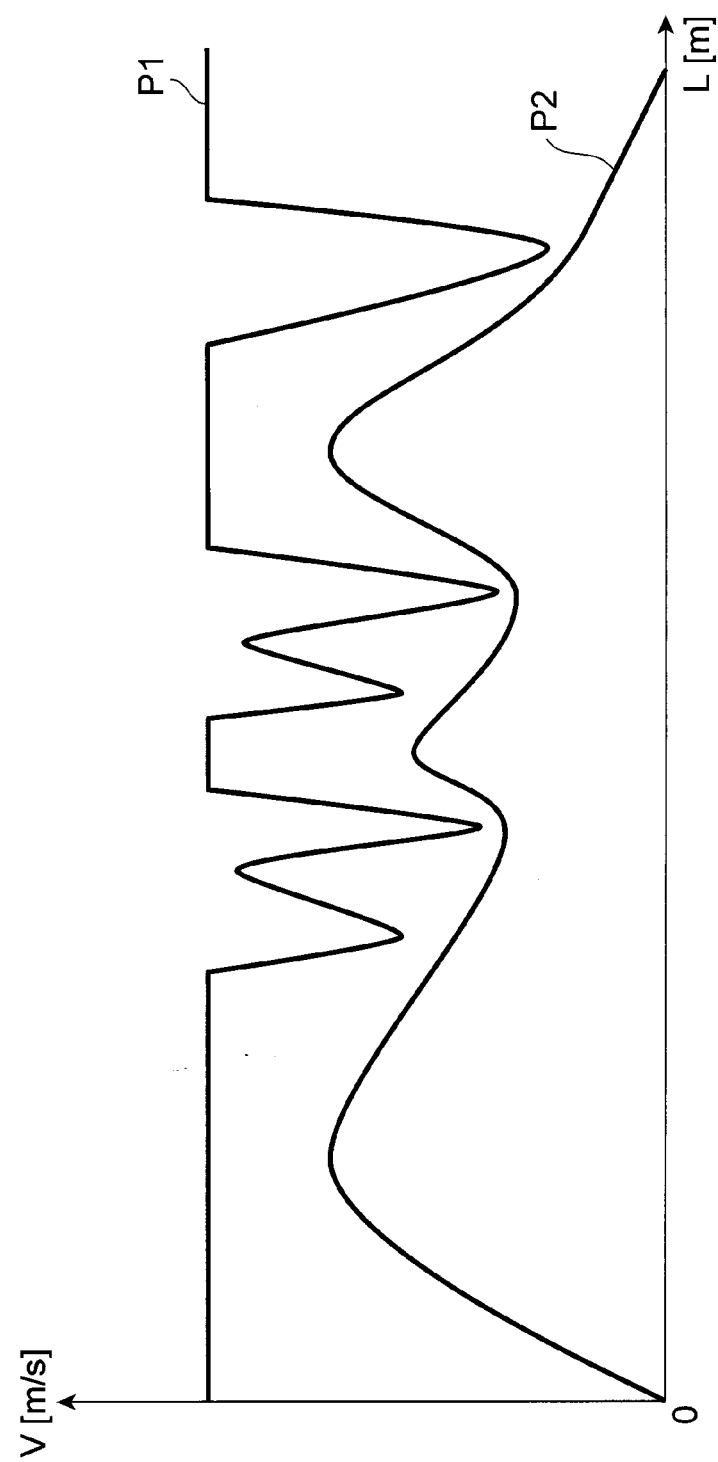
FIG. 3 shows an example of a stability speed limit pattern and a target speed pattern.

In the process of S12, the stability speed limit pattern generation unit 20 generates a stability speed limit pattern P1 on the basis of a plurality of road curvatures of the scheduled travel road. For example, the stability speed limit pattern generation unit 20 calculates a lowest speed from among the upper speed limit obtained from the curvature at the curve and the road surface frictional coefficient, the upper speed limit prescribed by laws and regulations, and the upper speed limit relating to vehicle performance as the stability speed limit by an optimization method. FIG. 3 is a graph showing an example of the stability speed limit pattern P1 and a target speed pattern P2. As shown in FIG. 3, the stability speed limit pattern P1 is created such that the speed falls near the curve, and the maximum speed is reached in a straight portion. If the process of S12 ends, a driver request input process is performed (S14).

In the process of S14, the target speed pattern generation unit 21 acquires a driver's request through the operation unit 32. For example, the target speed pattern generation unit 21 allows the driver to select the most important one of mileage preference travel, trip time preference travel, drivability preference travel, and environmentally restricted gas reduction travel through the operation unit 32, and acquires the selected travel as a drivers' requirement. If the process of S14 ends, a target speed pattern generation process is performed (S16).

In the process of S16, the target speed pattern generation unit 21 generates a target speed pattern P2. The target speed pattern generation unit 21 generates the target speed pattern P2 using, for example, the stability speed limit pattern P1 and the ideal speed pattern satisfying the driving conditions desired by the driver by an optimization method. For example, the target speed pattern generation unit 21 changes the ideal speed pattern satisfying the driving conditions desired by the driver to generate the target speed pattern P2 such that the target speed becomes lower than the stability speed limit obtained from the stability speed limit pattern P1. Thus, the target speed pattern P2 shown in FIG. 3 is generated. If the process of S16 ends, the control process shown in FIG. 2 ends. Through the control process shown in FIG. 2, the stability speed limit pattern P1 and the target speed pattern P2 are generated.

Figure 4:
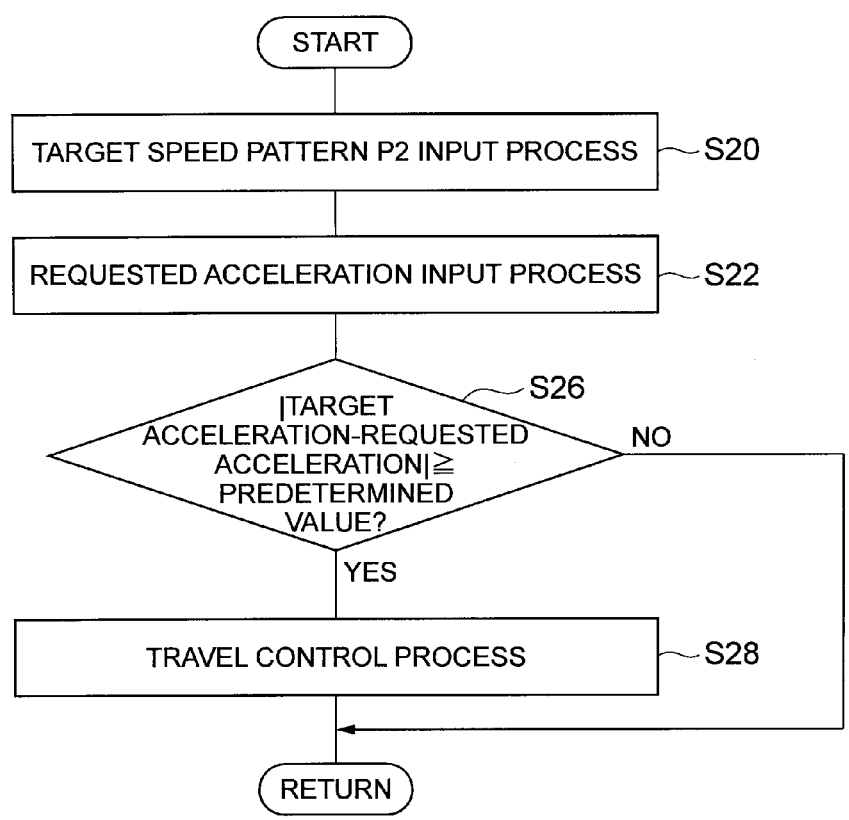
FIG. 4 is a flowchart showing a travel control operation based on a target speed pattern.

Next, travel control which is performed by the vehicle 5 using the target speed pattern generated in FIG. 2 will be described. FIG. 4 is a flowchart showing a travel control operation which is performed by the vehicle 5. A control process shown in FIG. 4 is performed, for example, at the time of the travel of the vehicle after the control process shown in FIG. 2 is performed. In FIG. 4, description will be provided as to a case where travel control based on acceleration is performed.

As shown in FIG. 4, the ECU 2 starts from a target speed pattern input process (S20). In the process of S20, the travel control unit 22 inputs the target speed pattern generated by the control process shown in FIG. 2. If the process of S20 ends, a requested speed input process is performed (S22).

In the process of S22, the travel control unit 22 receives a requested acceleration of the driver. For example, the requested acceleration is input on the basis of the amount of depression of the accelerator pedal. If the process of S22 ends, an acceleration determination process is performed (S24).

In the process of S24, the travel control unit 22 determines whether or not the absolute value of the difference between a target acceleration and the requested acceleration is equal to or greater than a predetermined value. For example, the travel control unit 22 integrates the target speed pattern input in the process of S22 to generate a target acceleration pattern, and calculate a target acceleration at a current time. The travel control unit 22 calculates the difference between the target acceleration at the current time and the requested acceleration input in the process of S22, and determines whether or not the absolute value of the calculated difference is equal to or greater than a predetermined value. In the process of S24, when the travel control unit 22 determines that the absolute value of the calculated difference is not equal to or greater than the predetermined value, the control process shown in FIG. 4 ends. In the process of S24, when the travel control unit 22 determines that the absolute value of the calculated difference is equal to or greater than the predetermined value, a travel control process is performed (S28).

Figure 5:
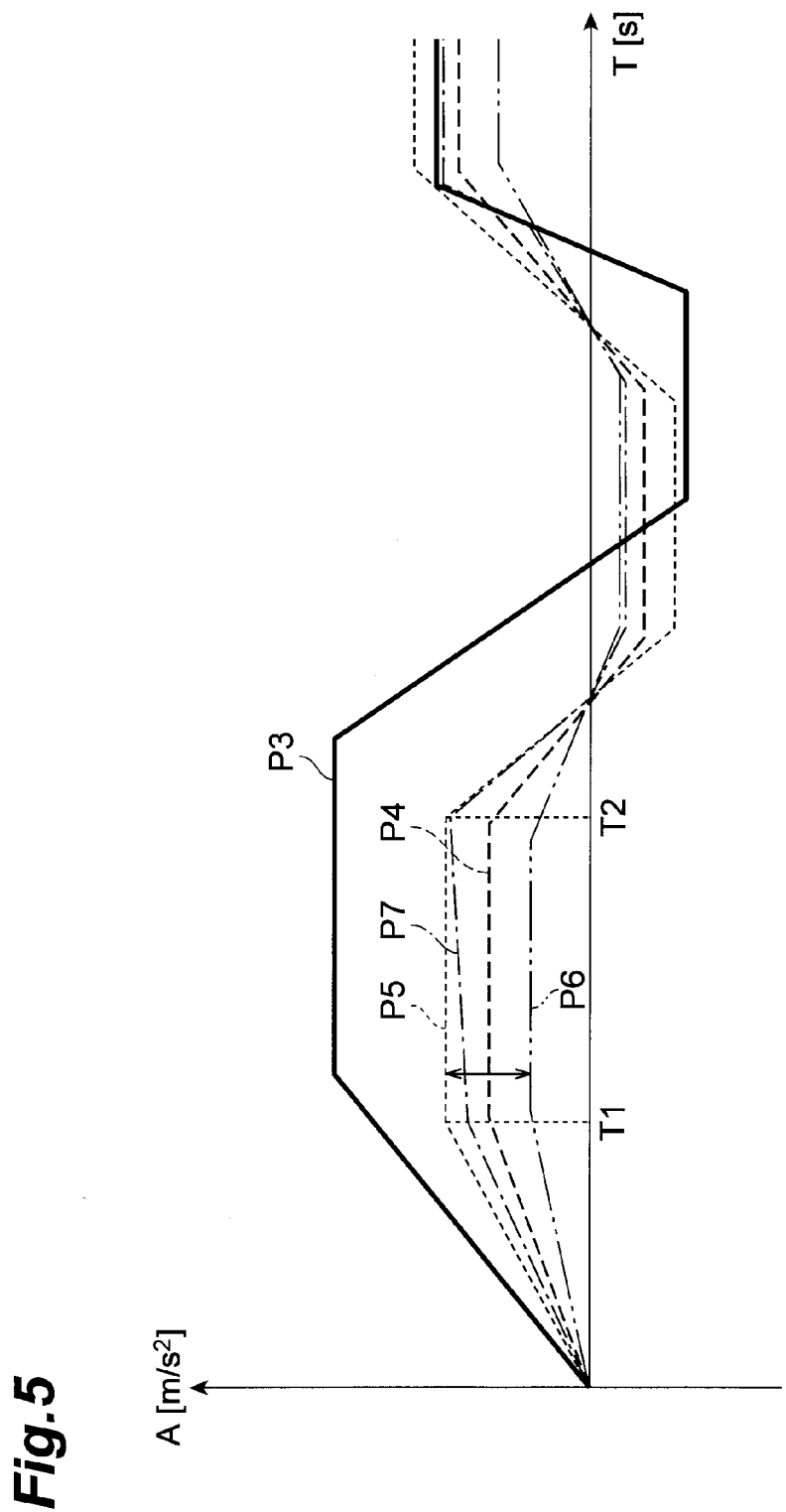
FIG. 5 shows an acceleration pattern illustrating a travel control operation.

In the process of S28, the travel control unit 22 performs travel control such that an actual acceleration becomes close to the target acceleration within a range such that a sense of discomfort is not imposed on the driver. This process will be described with reference to FIG. 5. FIG. 5 shows an acceleration pattern for illustrating travel control of the travel control unit 22. In FIG. 5, the target acceleration pattern calculated in the process of S26 is represented by P3, and the requested acceleration pattern of the driver acquired in the process of S22 is represented by P4. As shown in FIG. 5, the travel control unit 22 sets an adjustment range based on the discrimination threshold value with the requested acceleration pattern P4 as reference. This adjustment range has an upper limit value which is a value obtained by the discrimination threshold value to the requested acceleration pattern P4 and a lower limit value which is a value obtained by subtracting the discrimination threshold value from the requested acceleration pattern P4. That is, the requested acceleration pattern P4 is adjusted by the time-series discrimination value so as to be close to the target acceleration pattern P3 within the adjustment range, thereby enabling travel control without imposing a sense of discomfort on the driver. In FIG. 5, a time-dependent upper limit pattern of the adjustment range is represented by P5, and a time-dependent lower limit pattern of the adjustment range is represented by P6. For example, from the time T1 to the time T2, the travel control unit 22 raises the requested acceleration pattern P4 using a gradient in the time-series discrimination threshold value within a range without exceeding the upper limit pattern P5, and sets an acceleration pattern P7 close to the target acceleration pattern P3. The acceleration pattern P7 represents an actual acceleration by travel control. In this way, in the process of S28, the travel control unit 22 dynamically adjusts the driver's request within a range without imposing a sense of discomfort with the discrimination threshold value and the time-series discrimination threshold value as the intervention gain. If the process of S28 ends, the control process shown in FIG. 4 ends.

With the above, the control process shown in FIG. 4 ends. Through the control process shown in FIG. 4, travel control by a restrained change in characteristic is performed within a range without imposing a sense of discomfort on the driver such that the actual acceleration becomes close to the target acceleration.

Figure 6:
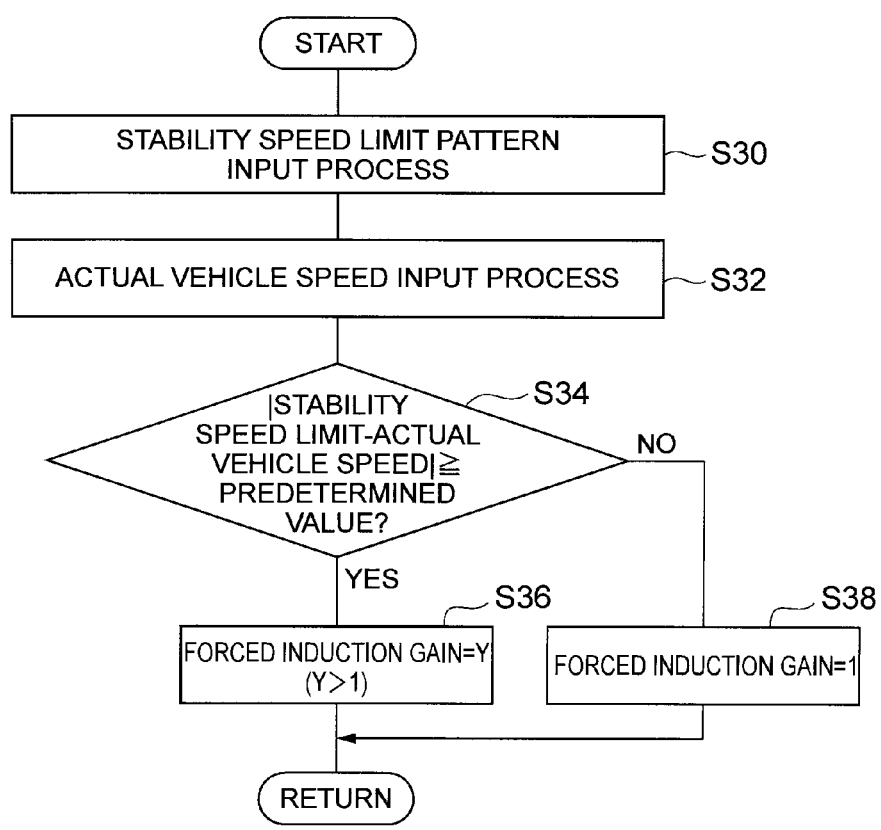
FIG. 6 is a flowchart illustrating the operation of a travel control device according to a first embodiment.

Next, an operation of the travel control device 1 to adjust the intervention gain used for travel control shown in FIG. 4 will be described. FIG. 6 is a flowchart showing an intervention gain adjustment operation which is performed by the travel control device 1. A control process shown in FIG. 6 is performed, for example, before the travel control process of S28 shown in FIG. 4 after the control process shown in FIG. 2 is performed. In FIG. 6, description will be provided as to a case where travel control based on speed is performed.

As shown in FIG. 6, the ECU 2 starts from a stability speed limit pattern input process (S30). In the process of S30, the gain change determination unit 10 inputs, for example, the stability speed limit pattern generated by the control process shown in FIG. 2. If the process of S30 ends, an actual speed input process is performed (S32).

In the process of S32, the gain change determination unit 10 inputs an actual vehicle speed. For example, an actual vehicle speed at the current time is input on the basis of the detection result of sensor 31. If the process of S32 ends, a speed determination process is performed (S34).

In the process of S34, the gain change determination unit 10 determines whether or not the absolute value of the difference between the stability speed limit and the actual speed is equal to or greater than a predetermined value. For example, the gain change determination unit 10 calculates a stability speed limit at a current position from the stability speed limit pattern input in the process of S32. The gain change determination unit 10 calculates the difference between the stability speed limit at the current position and the actual speed input in the process of S32, and determines whether or not the absolute value of the calculated difference is equal to or greater than a predetermined value. In the process of S34, when the gain change determination unit 10 determines that the absolute value of the calculated difference is equal to or greater than the predetermined value, a gain change process is performed (S36).

Figure 7:
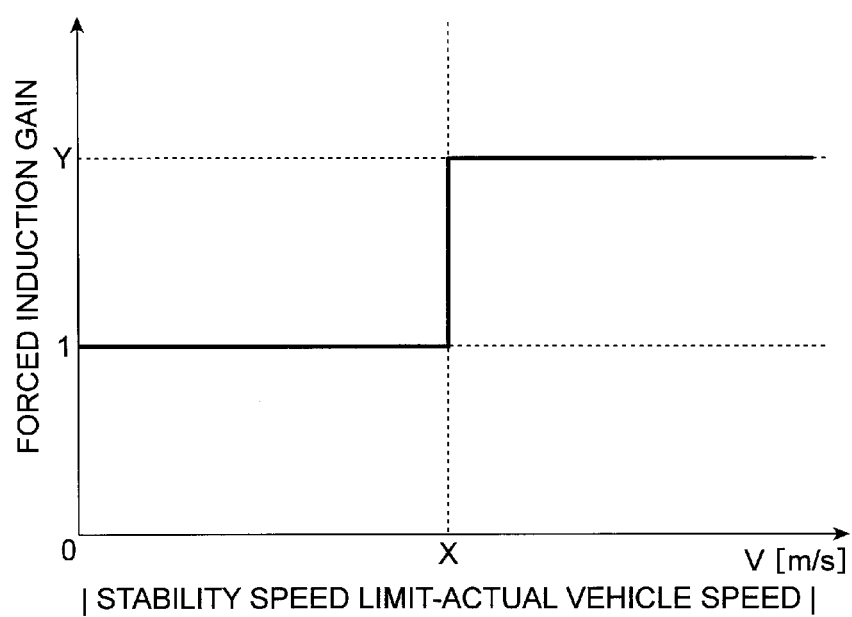
FIG. 7 is a graph showing the speed difference dependency of a forced induction gain.

In the process of S36, the forced induction gain changing unit 11 changes the intervention gain which is used in the travel control unit 22. The forced induction gain changing unit 11 changes, for example, the forced induction gain to increase the intervention gain. For example, it is assumed that the induction gain changing unit 11 adjusts the intervention gain using Expressions 1 and 2 described above. In this case, the induction gain changing unit 11 changes the forced induction gain $G_K$ using a map shown in FIG. 7. FIG. 7 is a graph showing the forced induction gain $G_K$ depending on the absolute value of the difference between the stability speed limit and the actual speed. The predetermined value used in the process of S34 is represented by X. As shown in FIG. 7, the forced induction gain changing unit 11 sets the forced induction gain $G_K$ to Y (Y>1) to significantly change the intervention gain. If the process of S36 ends, the control process shown in FIG. 6 ends.

Meanwhile, in the process of S34, when the forced induction gain changing unit 11 determines that the absolute value of the calculated difference is not equal to or greater than the predetermined value, the intervention gain which is used in the travel control unit 22 is not changed (S38). For example, when the induction gain changing unit 11 adjusts the intervention gain using Expressions 1 and 2 described above, as shown in FIG. 7, the induction gain changing unit 11 sets the forced induction gain $G_K$ to 1. If the process of S38 ends, the control process shown in FIG. 6 ends.

Figure 8:
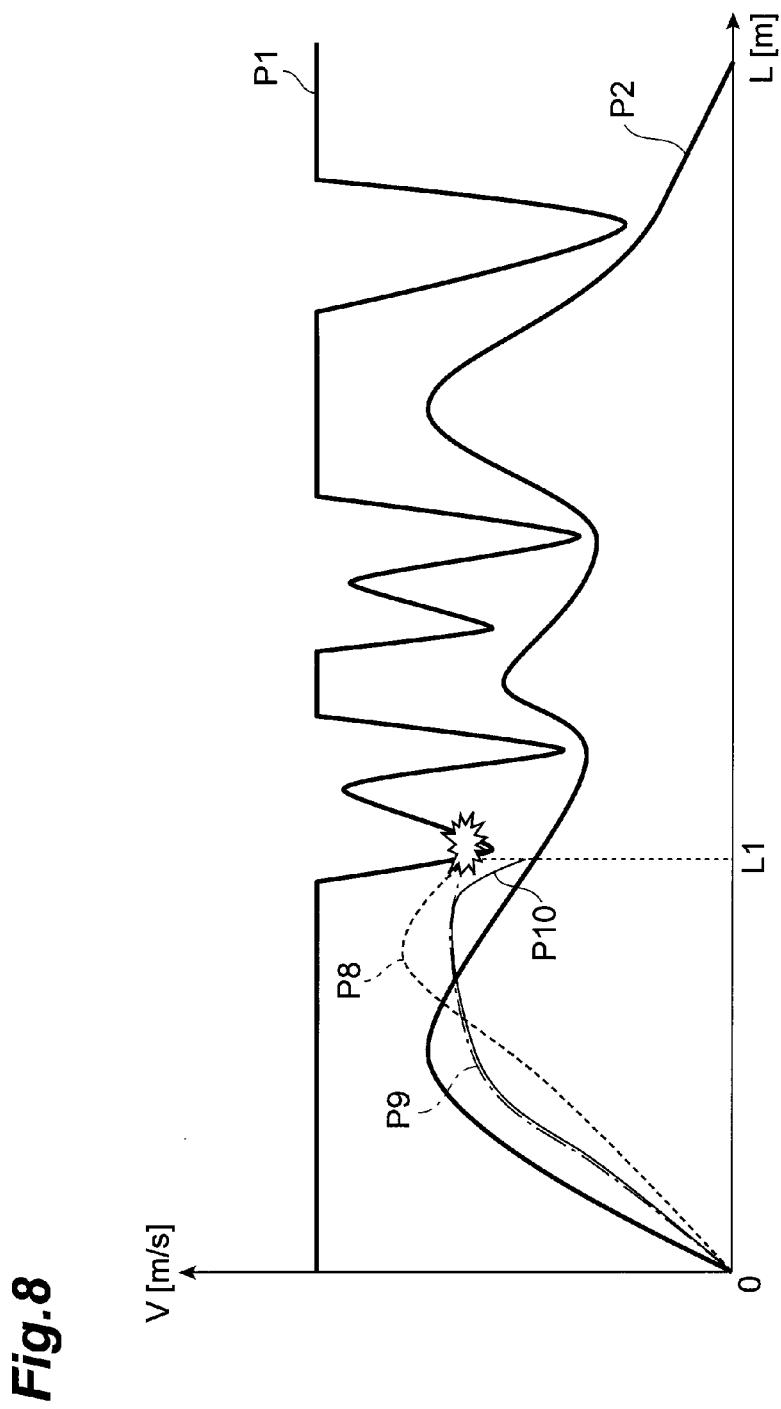
FIG. 8 is a graph illustrating the effects of the travel control device according to the first embodiment.

With the above, the control process shown in FIG. 6 ends. Through the control process shown in FIG. 6, when the actual vehicle speed is close to the stability vehicle speed limit, the intervention gain which is used for the travel control process of S28 shown in FIG. 4 is changed. For this reason, when the actual vehicle speed is closed to the stability vehicle speed limit, travel control in which the driver's request is easily reflected is changed to travel control in which vehicle-side induction is stronger. For example, it is assumed that the stability speed limit pattern P1 and the target speed pattern P2 are set as shown in FIG. 8. It is assumed that a requested speed pattern depending on the position of the driver is P8, and the vehicle speed exceeds the stability speed limit at a position L1. At the time of travel control in which the driver's request is easily reflected so as to suppress a sense of discomfort imposed on the driver, that is, when there is an acceleration request from the driver and the speed is controlled in response to the acceleration request, the actual speed may be close to the stability speed limit, or in some cases, as represented by P9, the actual speed may exceed the stability speed limit at the position L1. However, with the use of the travel control device 1 of this embodiment, it is possible to dynamically significantly change the intervention gain when the actual speed is close to the stability speed limit by equal to or greater than a predetermined value, making it possible to strengthen follow-up to the target speed. For this reason, as represented by P10, strong intervention control on the vehicle side is performed, thereby avoiding the actual speed from exceeding the stability speed limit at the position L1. In this case, when there is a high possibility that the previous adjustment result exceeds the stability limit, it becomes possible to ensure the stability of the vehicle through strong intervention.

As described above, according to the travel control device 1 of the first embodiment, the gain change determination unit 10 acquires the stability speed limit pattern P1 which represents the upper speed limit within which the vehicle is travelable without departing from the scheduled travel road. The forced induction gain changing unit 11 adjusts travel control, which is performed using the target speed pattern P2, on the basis of the stability speed limit pattern P1 and the actual speed. For this reason, for example, when travel control is performed such that the actual speed is changed to become the target speed derived from the target speed pattern P2 satisfying the desire of the driver, it is possible to adjust travel control while evaluating travel stability on the basis of the stability speed limit pattern P1 and the actual speed. That is, it is sequentially verified whether or not the actual vehicle speed exceeds the stability speed limit derived from the stability speed limit pattern P2, and when the actual vehicle speed becomes close to the stability speed limit, it becomes possible to adjust travel control to ensure the stability. For example, in the travel control device of the related art, travel control during traveling is performed such that the actual vehicle speed becomes equal to or lower than the stability speed limit. For this reason, in the travel control device of the related art, if the stability speed limit is, for example, 60 km/hr, control is simply performed such that the actual vehicle speed becomes 60 km/hr. If the stability speed limit is equal to or lower than 60 km/hr, the control result may be 50 km/hr, 40 km/hr, or 30 km/hr. For this reason, for example, even when the optimum speed when mileage is given preference is 50 km/hr, and the optimum speed when ride quality is given preference is 30 km/hr, in the travel control device of the related art, it is difficult to determine which speed the desired speed of the driver is, making it difficult to set an optimum control value. Although cooperation control may be performed with reference to only the target speed pattern P2, when the desire of the driver is given preference or when the reduction of a sense of discomfort due to intervention control is given importance, it is difficult to determined how much the acceleration request of the driver is given preference or limited, such that travel stability may not be ensured. In contrast, in the travel control device 1 of the first embodiment, it is possible to perform control such that the target speed pattern P2 satisfying the desire of the driver is obtained within a stable speed range with reference to the stability speed limit pattern P1. That is, in the travel control device 1 of the first embodiment, it is possible to dynamically utilize the stability speed limit pattern P1 as well as to use the stability speed limit pattern P1 when generating the target speed pattern P2. Therefore, it becomes possible to satisfy the driving conditions desired by the driver while ensuring travel stability.

According to the travel control device 1 of the first embodiment, it is possible to change the degree of intervention of travel control in accordance with whether or not the acceleration request of the driver is within the speed range satisfying travel stability. For this reason, it becomes possible to reduce a sense of discomfort imposed on the driver due to intervention control on the device side within the speed range satisfying travel stability.

(Second Embodiment)

A travel control device 1 of a second embodiment substantially has the same configuration as the travel control device 1 of the first embodiment, and only the map showing the forced induction gain $G_K$ depending on the absolute value of the difference between the stability speed limit and the actual speed is different from the travel control device 1 of the first embodiment. In the second embodiment, description of the portions overlapping the first embodiment will not be repeated, and description will be provided focusing on the difference.

The configuration of the vehicle 5 including the travel control device 1 of this embodiment is the same as the vehicle 5 including the travel control device 1 of the first embodiment. The travel control device 1 of this embodiment is the same configuration as the travel control device 1 of the first embodiment, except for only the map which is referenced by the forced induction gain changing unit 11. Other functions are the same as the forced induction gain changing unit 11 of the first embodiment.

Figure 9:
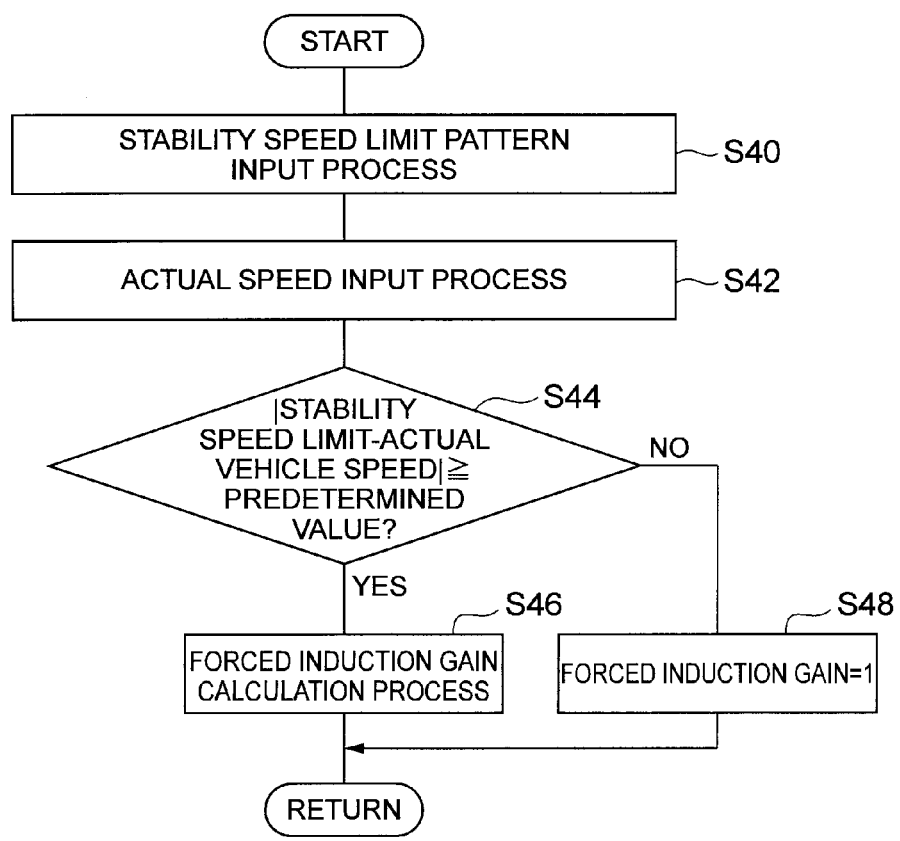
FIG. 9 is a flowchart illustrating the operation of a travel control device according to a second embodiment.

Next, the operation of the travel control device 1 of the second embodiment will be described. FIG. 9 is a flowchart showing an intervention gain adjustment operation which is performed by the travel control device 1 of the second embodiment. A control process shown in FIG. 9 is performed, for example, before the travel control process of S28 shown in FIG. 4 after the control process shown in FIG. 2 is performed. It is assumed that the stability speed limit pattern P1 and the target speed pattern P2 are generated by the control process shown in FIG. 2, and travel control is performed by the control process shown in FIG. 4. In FIG. 9, description will be provided as to a case where travel control based on speed is performed.

As shown in FIG. 9, the ECU 2 starts from a stability speed limit pattern input process (S40). The process of S40 is the same as the process of S30. If the process of S40 ends, an actual speed input process is performed (S42).

In the process of S42, the gain change determination unit 10 inputs the actual vehicle speed. The process of S42 is the same as the process of S32. If the process of S42 ends, a speed determination process is performed (S44).

In the process of S44, the gain change determination unit 10 determines whether or not the absolute value of the difference between the stability speed limit and the actual speed is equal to or greater than a predetermined value. The process of S44 is the same as the process of S34. In the process of S44, when the gain change determination unit 10 determines that the absolute value of the calculated difference is equal to or greater than the predetermined value, a gain change process is performed (S46).

Figure 10:
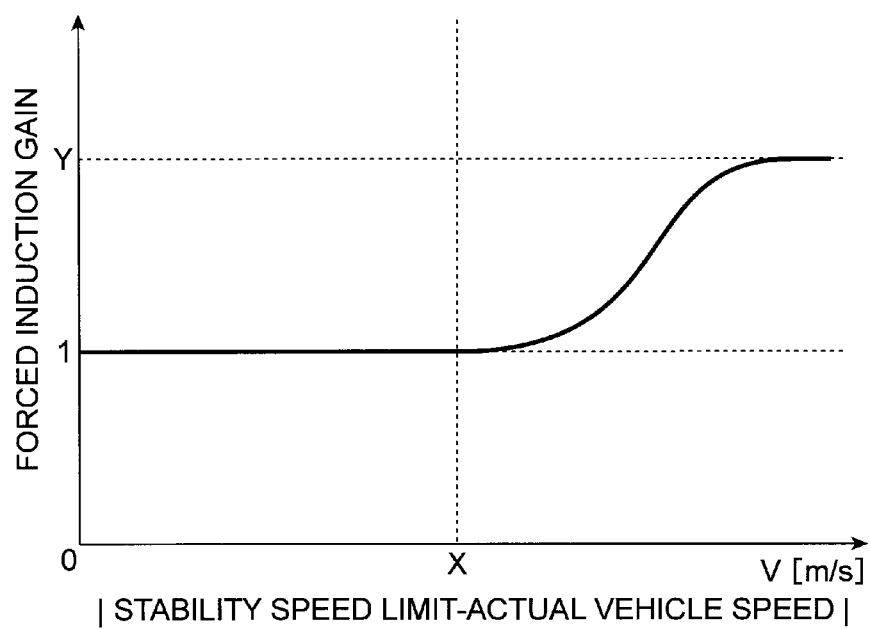
FIG. 10 is a graph showing the speed difference dependency of a forced induction gain.

In the process of S46, the forced induction gain changing unit 11 calculates the forced induction gain $G_K$, and changes the intervention gain using the calculated forced induction gain $G_K$. For example, it is assumed that the induction gain changing unit 11 adjusts the intervention gain using Expressions 1 and 2 described above. In this case, the induction gain changing unit 11 changes the forced induction gain $G_K$ using a map shown in FIG. 10. FIG. 10 is a map showing the forced induction gain $G_K$ depending on the absolute value of the difference between the stability speed limit and the actual speed. In FIG. 10, the predetermined value used in the process of S44 is represented by X. As shown in FIG. 10, the forced induction gain changing unit 11 sets such that, as the absolute value of the difference between the stability speed limit and the actual speed increases, the forced induction gain $G_K$ gradually and continuously increases. If the process of S46 ends, the control process shown in FIG. 9 ends.

Meanwhile, in the process of S44, when the forced induction gain changing unit 11 determines that the absolute value of the calculated difference is not equal to or greater than the predetermined value, the intervention gain which is used in the travel control unit 22 is not changed (S48). For example, when the induction gain changing unit 11 adjusts the intervention gain using Expressions 1 and 2 described above, as shown in FIG. 10, the induction gain changing unit 11 sets the forced induction gain $G_K$ to 1. If the process of S48 ends, the control process shown in FIG. 9 ends.

With the above, the control process shown in FIG. 9 ends. Through the control process shown in FIG. 9, when the actual vehicle speed is close to the stability vehicle speed limit, the intervention gain which is used in the travel control process of S28 shown in FIG. 4 is gradually changed in accordance with the difference between the actual vehicle speed and the stability vehicle speed limit. For this reason, when the actual vehicle speed is close to the stability vehicle speed limit, travel control in which the request of the driver is easily reflected is continuously changed to travel control in which vehicle-side induction is stronger.

As described above, according to the travel control device 1 of the second embodiment, it is possible to gradually increase or gradually decrease the degree of intervention of travel control in accordance with the difference between the stability speed limit and the actual speed. That is, according to the travel control device 1 of the second embodiment, it is possible to avoid the intervention gain from being significantly changed when the actual vehicle speed is close to the stability speed limit. Thus, it becomes possible to further reduce a sense of discomfort due to intervention control on the device side while ensuring stable travel. It is also possible to comparatively flexibly set the predetermined value X for determining a change in the intervention gain, making it possible to prevent the intervention timing from being conclusively delayed. For this reason, it becomes easy to realize the stability management, and it is possible to easily combine the desire of the driver and travel stability.

(Third Embodiment)

A travel control device 1 of a third embodiment substantially has the same configuration of the travel control device 1 of the first or second embodiment, and is different from the travel control device 1 of the first or second embodiment in that the future is predicted and travel control is performed. In the third embodiment, description of the portions overlapping the first and second embodiments will not be repeated, and description will be provided focusing on the difference.

The configuration of the vehicle 5 including the travel control device 1 of this embodiment is the same as the vehicle 5 including the travel control device 1 of the first or second embodiment. The travel control device 1 of this embodiment substantially has the same configuration as the travel control device 1 of the first or second embodiment, except for some of the functions of the gain change determination unit (speed difference prediction unit) 10 and the forced induction gain changing unit 11.

The gain change determination unit 10 of this embodiment has a function of predicting the difference between a future speed when the vehicle passes through a future arrival point of the scheduled travel road according to the scheduled travel locus and a future stability speed limit derived from the stability speed limit pattern P1 on the basis of the actual speed. For example, the gain change determination unit 10 sets a preview time $T_{pre}$ for defining how much future is predicted. For example, if the preview time $T_{pre}$ is 5 seconds, the vehicle state when 5 seconds have elapsed is predicted. The gain change determination unit 10 estimates a vehicle speed $V_{pre}$ and a position (a moving distance $L_{pre}$ for the preview time $T_{pre}$) when the preview time $T_{pre}$ has elapsed on an assumption that a current speed $V_x$ and an acceleration $a_x$ are constant until the preview time $T_{pre}$ elapses. That is, the gain change determination unit 10 estimates the vehicle speed $V_{pre}$ and the distance $L_{pre}$ when the preview time $T_{pre}$ has elapsed on an assumption that the vehicle 5 moves with a constant acceleration. The gain change determination unit 10 estimates the vehicle speed $V_{pre}$ and the position $L_{pre}$ using, for example, Expressions 3 and 4.

$$V_{pre} = V_x + a_x \cdot T_{pre} \quad (3)$$

$$L_{pre} = V_x \cdot T_{pre} + \frac{1}{2} \cdot a_x \cdot T_{pre}^2 \quad (4)$$

The forced induction gain changing unit 11 of this embodiment has a function of calculating a forced induction gain $G_{pre}$ on the basis of the difference between the future speed and the future stability speed limit. For example, as in the first and second embodiments, the forced induction gain changing unit 11 calculates the forced induction gain $G_{pre}$ using a map. When the forced induction gain $G_K$ obtained in the first or second embodiment is set as a forced induction gain $G_{now}$, the forced induction gain changing unit 11 has a function of comparing the forced induction gain $G_{now}$ with the forced induction gain $G_{pre}$ and using the larger forced induction gain from among both the forced induction gains such that travel control in which travel stability is given preference is performed. Other functions are the same as the forced induction gain changing unit 11 of the first or second embodiment.

Figure 11:
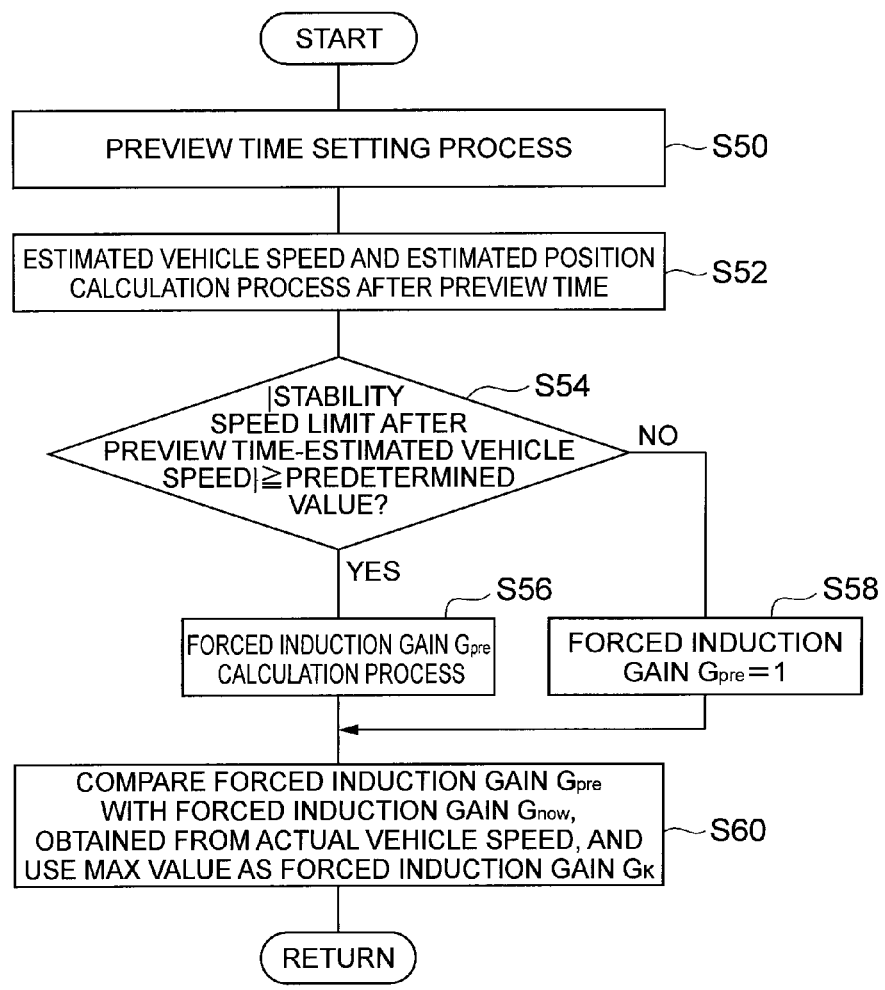
FIG. 11 is a flowchart illustrating the operation of a travel control device according to a third embodiment.

Next, the operation of the travel control device 1 of the third embodiment will be described. FIG. 11 is a flowchart showing an intervention gain adjustment operation which is performed by the travel control device 1 of the third embodiment. A control process shown in FIG. 11 is performed, for example, before the travel control process of S28 shown in FIG. 4 after the control process shown in FIG. 2 is performed. It is assumed that the stability speed limit pattern P1 and the target speed pattern P2 are generated by the control process shown in FIG. 2, and travel control is performed by the control process shown in FIG. 4. It is also assumed that the forced induction gain $G_{now}$ is generated using FIG. 9. In FIG. 11, description will be provided as to a case where travel control based on speed is performed.

As shown in FIG. 11, the gain change determination unit 10 starts from a process for setting the preview time $T_{pre}$ (S50). In the process of S50, the gain change determination unit 10 sets the predetermined preview time $T_{pre}$. If the process of S50 ends, a vehicle state estimation process is performed (S52).

Figure 12:
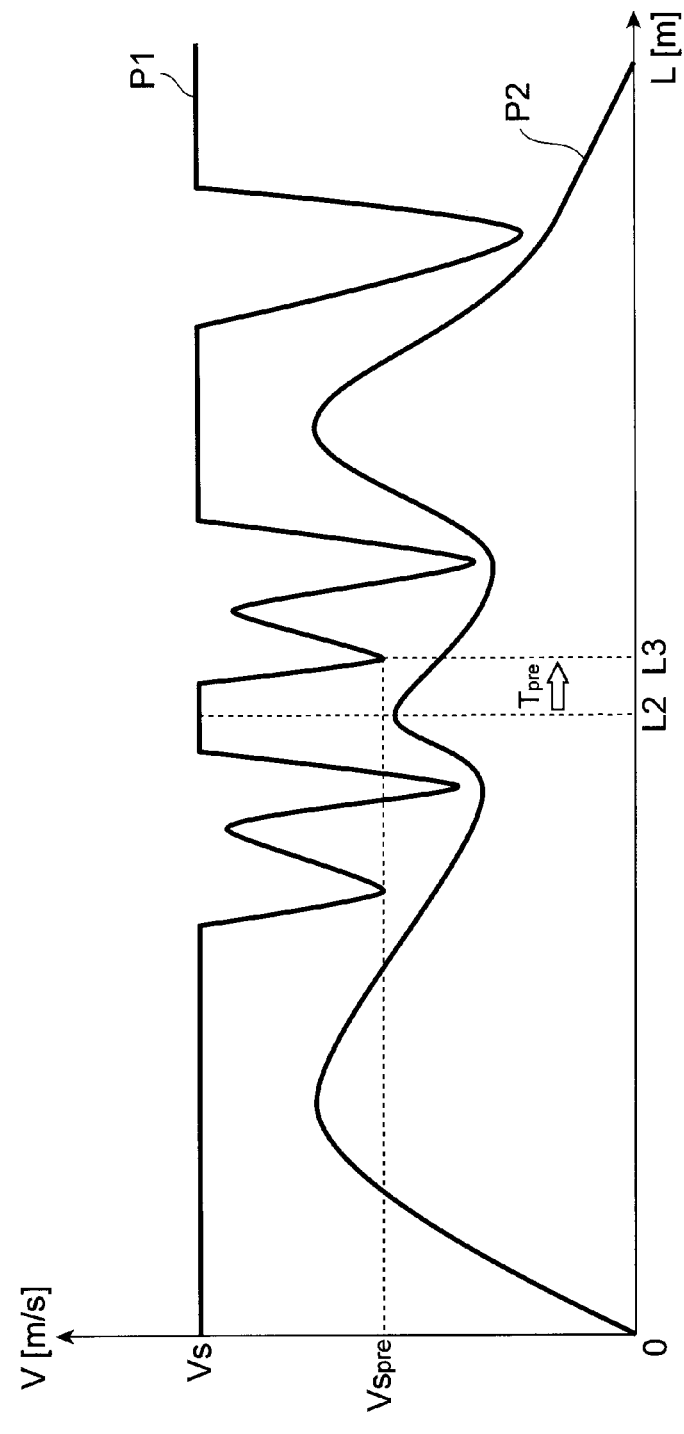
FIG. 12 shows a speed pattern illustrating the operation of the travel control device according to the third embodiment.

In the process of S52, the gain change determination unit 10 estimates the vehicle state when the preview time $T_{pre}$ has elapsed. The gain change determination unit 10 inputs the current actual vehicle speed $V_x$, the acceleration $a_x$, and the current position L2. The future vehicle speed $V_{pre}$ and the moving distance $L_{pre}$ are calculated using Expressions 3 and 4 described above. For example, as shown in FIG. 12, it is assumed that the stability speed limit pattern P1 and the target speed pattern P2 are set, and the current position is L2. In this case, the gain change determination unit 10 calculates a future position L3 when the preview time $T_{pre}$ has elapsed using the moving distance $L_{pre}$. If the process of S52 ends, a speed determination process is performed (S54).

In the process of S54, the gain change determination unit 10 determines whether or not the absolute value of the difference between the future stability speed limit $Vs_{pre}$ and the future actual speed $V_{pre}$ is equal to or greater than a predetermined value. As shown in FIG. 12, the gain change determination unit 10 calculates the stability speed limit $Vs_{pre}$ when the preview time $T_{pre}$ has elapsed using the stability speed limit pattern P1 and the position L3 calculated in the process of S52. The gain change determination unit 10 determines whether or not the absolute value of the difference between the stability speed limit $Vs_{pre}$ and the future vehicle speed $V_{pre}$ calculated in the process of S52 is equal to or greater than the predetermined value. In the process of S54, when the gain change determination unit 10 determines that the absolute value of the calculated difference is equal to or greater than the predetermined value, a gain calculation process is performed (S56).

In the process of S56, the forced induction gain changing unit calculates the forced induction gain $G_{pre}$ based on preview information. For example, it is assumed that the induction gain changing unit 11 adjusts the intervention gain using Expressions 1 and 2 described above. In this case, the induction gain changing unit 11 calculates the forced induction gain $G_{pre}$ using the map shown in FIG. 10. If the process of S56 ends, an induction gain determination process is performed (S60).

In the process of S60, the forced induction gain changing unit 11 compares the current forced induction gain $G_{now}$ with the forced induction gain $G_{pre}$ based on the preview information, and sets the larger forced induction gain as the forced induction gain $G_K$. The forced induction gain changing unit 11 compares the forced induction gain $G_{now}$ generated by the control process shown in FIG. 9 with the forced induction gain $G_{pre}$ calculated in the process of S56 (S58), and sets the larger forced induction gain as the forced induction gain $G_K$. If the process of S60 ends, the control process shown in FIG. 11 ends.

Meanwhile, in the process of S54, when the forced induction gain changing unit 11 determines that the absolute value of the calculated difference is not equal to or greater than the predetermined value, the intervention gain which is used in the travel control unit 22 is not changed (S58). For example, when the induction gain changing unit 11 adjusts the intervention gain using Expressions 1 and 2 described above, as shown in FIG. 10, the induction gain changing unit 11 sets the forced induction gain $G_K$ to 1. If the process of S58 ends, an induction gain determination process is performed (S60) to compare the forced induction gain $G_{now}$ with the forced induction gain $G_{pre}$ and to set the larger forced induction gain as the forced induction gain $G_K$.

With the above, the control process shown in FIG. 11 ends. Through the control process shown in FIG. 11, a future event is predicted using future information, and current travel control is adjusted on the basis of the predicted event. For this reason, when the actual vehicle speed is likely to be close the stability vehicle speed limit at the current time or in the future, it is possible to change travel control in which the request of the driver is easily reflected to travel control in which vehicle-side induction is stronger.

As described above, according to the travel control device 1 of the third embodiment, it is possible to determine whether or not it is within the speed range satisfying travel stability in the future using the difference between the future vehicle speed $V_{pre}$ and the future stability speed limit $Vs_{pre}$ derived from the stability speed limit pattern. As described above, the advantage having the preview information, such as the stability speed limit pattern, is sufficiently utilized, such that, even when the stability speed limit rapidly changes due to a rapid change in the curve radius, or the like, it is possible to avoid the intervention timing of travel control from being delayed, and it also becomes easy to realize the stability management. Therefore, it is possible to satisfy the driving conditions desired by the driver while predicting and verifying travel stability.

The above-described embodiments are an example of the travel control device according to the invention. The travel control device according to the invention is not limited to the travel control devices of the embodiments, and the travel control device of each embodiment may be modified or applied to others within the scope without changing the subject matter described in the appended claims.

For example, although in the above-described embodiments, an example has been described where travel control is performed using the speed pattern or the acceleration pattern, in the control using the speed pattern, the speed pattern may be replaced with an acceleration pattern or a jerk pattern, and in the control using the acceleration pattern, the acceleration pattern may be replaced with a speed pattern or a jerk pattern.

Although in the above-described embodiments, the method of calculating the stability speed limit pattern P1 has been described, the invention is not limited thereto. For example, the stability speed limit pattern P1 may be generated using only a road curvature or may be generated using only a road shape. That is, the travel control device 1 of this embodiment can achieve the effects regardless of the method of generating the stability speed limit pattern P1.

Although in the above-described embodiments, the method of calculating the target speed pattern P2 has been described, the invention is not limited thereto. For example, the target speed pattern P2 may be generated by another method, and it is not necessary to generate the target speed pattern P2 after the stability speed limit pattern P1 is generated. That is, the travel control device 1 of this embodiment can achieve the effects regardless of the method of generating the target speed pattern P2.

Reference Signs List

1: travel control device, 2: ECU, 5: vehicle, 10: gain change determination unit (acquisition unit, travel control adjustment unit), 11: forced induction gain changing unit (travel control adjustment unit), 20: stability speed limit pattern generation unit, 21: target speed pattern generation unit, 22: travel control unit, 23: acceleration/deceleration control unit.

The invention claimed is:

1. A travel control device which controls the travel of a vehicle, the travel control device comprising:
   an acquisition unit which acquires a stability speed limit pattern indicating an upper speed limit, within which the vehicle is travelable without departing from a scheduled travel road;
   an operation unit which inputs driving conditions desired by a driver;
   a travel control unit which performs intervention control such that a difference between a target speed derived using a taragt speed pattern and a requested speed of the driver decreases; and
   a travel control adjustment unit which adjusts travel control using the target speed pattern indicating the target speed on the basis of the stability speed limit pattern and an actual speed,
   wherein the target speed pattern is generated using an ideal speed pattern satisfying the driving conditions input by the operation unit, and
   wherein the travel control unit performs intervention control with a discrimination threshold value and a time-series discrimination threshold value as an intervention gain, and the travel control unit performs control such that a vehicle speed becomes as close to the target speed within a range such that a variation in the speed or acceleration due to intervention control does not exceed the discrimination threshold value and a differential amount of the speed or acceleration due to intervention control does not exceed the time series discrimination threshold value.

2. The travel control device according to claim 1, wherein the stability speed limit pattern is generated on the basis of a plurality of road curvatures of the scheduled travel road.

3. The travel control device according to claim 2, wherein the travel control adjustment unit changes the degree of intervention of travel control between when the difference between the actual speed and the upper speed limit derived from the stability speed limit pattern is equal to or greater than a predetermined value and when the difference is smaller than the predetermined value.

4. The travel control device according to claim 3, wherein the travel control adjustment unit continuously changes the degree of intervention of travel control in accordance with the difference between the actual speed and the upper speed limit derived from the stability speed limit pattern.

5. The travel control device according to claim 1, further comprising:
   a speed difference prediction unit which predicts the difference between a future speed when passing through a future arrival point in a scheduled travel locus of the scheduled travel road and a future upper speed limit derived from the stability speed limit pattern on the basis of the actual speed, wherein the travel control adjustment unit changes the degree of intervention of travel control between when the difference between the future speed and the future upper speed limit derived from the stability speed limit pattern is equal to or greater than a predetermined value and when the difference is smaller than the predetermined value.

\* \* \* \* \*